Patented June 12, 1923.

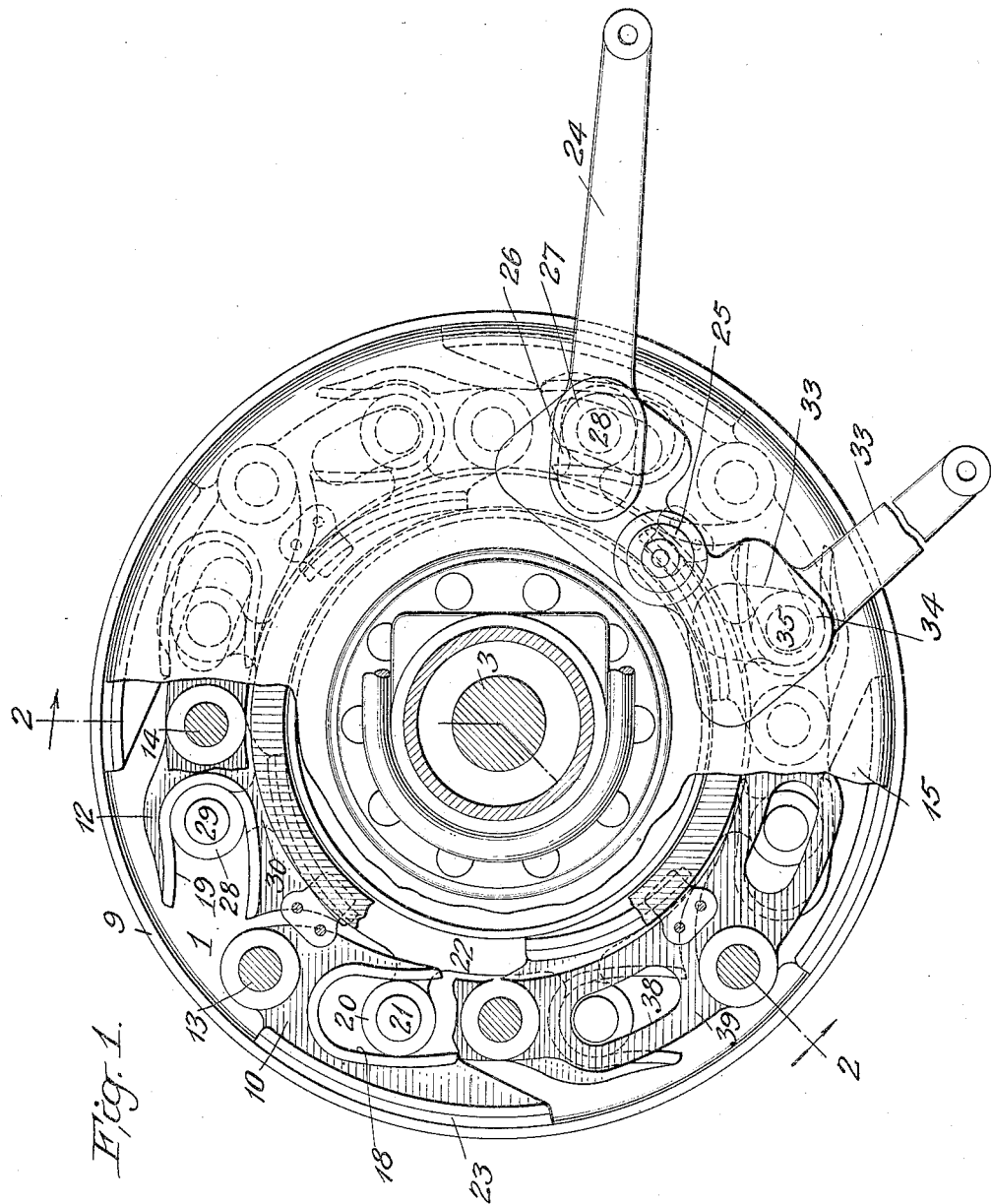

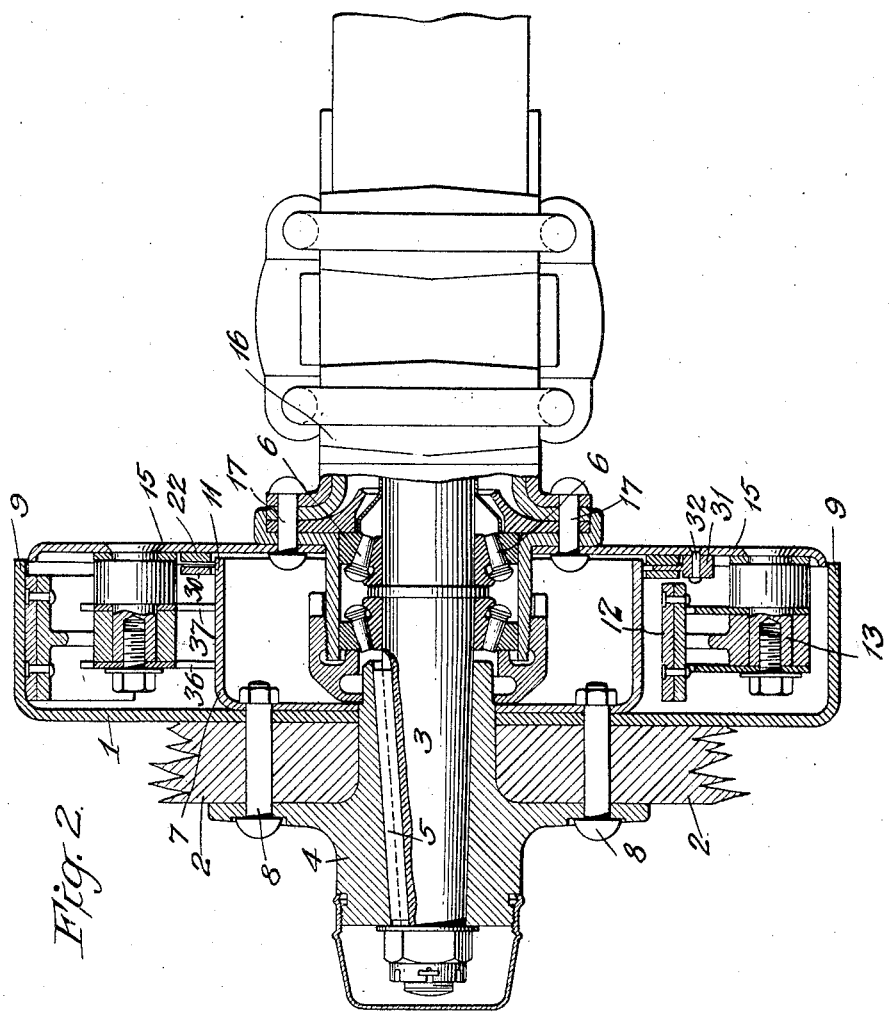

1,458,730

UNITED STATES PATENT OFFICE.

RICHARD SCHMITZ, OF CHICAGO, ILLINOIS.

AUTOMOBILE BRAKE.

Application filed December 9, 1920. Serial No. 429,398.

*To all whom it may concern:*

Be it known that I, RICHARD SCHMITZ, a citizen of the United States, and resident of Chicago, in the county of Cook and State of Illinois, have invented a certain new and useful Improvement in Automobile Brakes, of which the following is a specification.

My invention relates to that class of brakes which are employed on a brake drum attached to the wheel of the automobile. It is customary to provide a brake drum which is secured to the spokes of the wheel and a band brake is mounted outside of the laterally extending flange on the brake drum which generally is the service or foot brake, while the emergency brake is mounted inside of the drum and the friction engaging member engages the inner surface of the same flange. This type of brake is objectionable for a number of reasons among which might be mentioned the fact that the band brake on the exterior of the drum is a very dirty device providing a lodgment for dirt, gravel, stones, etc. flying up from the road. Besides that, the bands almost always drag upon the drum producing friction, and they are always noisy. It is difficult to lubricate them satisfactorily. Moreover, when used in a hilly country, the brake drum heats up and burns the brake lining out. Now when the emergency brake is thrown on to the same flange already heated by the application of the foot or service brake, the brake lining on the friction engaging surface of the emergency brake is quickly burned out.

My invention has for its object to provide a brake for automobiles in which there will be no exposed or external brake, and has for its further object to provide separate flanges to be engaged by the service and emergency brakes, and has for its further object to provide a construction whereby the entire braking mechanism may be enclosed in a casing which will effectually exclude dust, dirt, moisture, etc. from the working parts, thus permitting the device to be lubricated, and the construction is such that the lubricant will be retained for an indefinite period.

My means of accomplishing the foregoing objects may be more readily understood by having reference to the accompanying drawings which are hereunto annexed and are a part of this specification in which—

Fig. 1 is a side elevation of a brake drum constructed in accordance with my improvement, a portion of the outer plate being broken away to show the interior construction, certain parts being shown in section.

Fig. 2 is a sectional view taken on the line 2—2 in Fig. 1, in the direction indicated by the arrows.

Similar reference numerals refer to similar parts throughout the entire description.

As shown in the drawings, I have illustrated the application of the improvement to but a single brake, but it will be obvious from the hereinafter contained description, that the device may be multiplied for as many wheels as desired.

As shown in the drawings, I provide a brake drum 1 which is secured to the spokes 2 of the wheel, a fragmentary portion only being shown, as obviously the wheel forms no part of my invention. The wheel is mounted upon an axle 3, the hub 4 being secured thereto by means of a key 5 or in any other suitable or convenient manner. The axle 3 rotates upon antifriction bearings 6 of the usual or standard construction. Inside of the drum 1, I mount a similar drum 7 which is secured in position by means of bolts 8 which are the same bolts employed to secure the brake drum 1 to the wheel.

The brake drum 1 is formed with a laterally extending flange 9, the inner surface of which is adapted to be engaged by brake shoes 10. The inner brake drum 7 is also provided with a laterally extending flange 11, the external surface of which is adapted to be engaged by brake shoes 12. These shoes are pivotally mounted upon pivots 13 and 14 which are carried by a plate or brake anchor 15 which closes the opening formed by the laterally extending flange 9. This brake anchor is securely fastened to the axle housing 16 by means of rivets 17, although it will be obvious that any suitable or convenient means of anchoring the plate 15 may be employed if desired.

The brake shoes 10 and 12 are provided with U-shaped arcuate recesses 18 and 19. The recesses 18 are engaged by rollers 20 which are carried by pins 21 mounted in a spider 22 which is adapted to be rotated about the external surface of the laterally extending flange 11. It will be obvious that the rotation of the spider 22 about its axis will carry with it the rollers 20, and in this manner swing the brake shoes 10 outwardly on the pivots 13 causing the friction engaging surface 23 to engage the inner surface of the laterally extending flange 9 of the brake drum 1.

As illustrated, the spider has been swung about its axis and the brake shoes 10, of which as shown, there are four, although it will be apparent that any desired number may be used, are engaging the inner surface of the flange 9. This movement of the spider 22 is brought about through the medium of a lever 24 which is pivotally secured upon a stud 25 which is rigidly secured to the plate or brake anchor 15. The lever 24 is provided with a slot 26 and the walls of this slot engage a roller 27 which is mounted upon a pin 28 which extends laterally from the spider 22, but on the opposite side from which the pins 21 extend.

The surfaces of the U-shaped recesses 19 are engaged by rollers 28 which are rotatably mounted on pins 29 carried by a spider 30 which is also mounted to rotate about the external surface of the flange 11 of the inner brake drum 7. Guides 31 are attached by means of rivets 32 or any other suitable fastening device, to the plate or brake anchor 15, and serve to guide the spiders and hold them in proper position, thus preventing their rubbing against each other and creating undue friction when operated. The spider 30 is rotated about its axis by means of a lever 33 which is also provided with a slot 34, as in the lever 24. This slot is engaged by a roller 34' mounted upon a stud 35 which is carried by the spider 30.

The lever 33 is also pivotally secured to the pin or pivot 25. It will be apparent from the foregoing description that the stud 35 and the stud 28 have the same radius and consequently swing about the same axis, in this way permitting their being connected together so that the operation of one of the levers will operate both the brake shoes 10 and the brake shoes 12.

At the same time it will be apparent that these shoes bear upon entirely separate and distinct braking surfaces and consequently it is possible when one has become unduly heated, to discontinue its use, and resort to the other brake until the first has had an opportunity to radiate the excess heat which it has acquired.

It will be apparent from the foregoing description that the plate or brake anchor 15 effectually prevents the entrance of dirt, water, etc. to the interior part of the brake.

It will also be apparent that the device operates to mechanically move and hold the brake shoes 10 and 12 out of contact with the friction surfaces which they engage when the brake is applied for the purpose of stopping the wheel. Therefore, there can be no dragging of the brake and hence no unnecessary friction from this condition.

I provide stud supporting plates 36 and 37 which are provided with suitable slots 38 in which the pins on the spiders may slide.

The operation of the device is as follows:

When pressure is exerted upon the foot or service pedal (not shown) which is suitably connected to the lever 24, it will be swung into the position shown in Fig. 1. This movement will carry the stud 28 about the axle 3, thus moving the spider 22 and hence the rollers 20 which will roll upon the U-shaped surfaces 18 and swing the brake shoes 10 out to the position shown, when they will engage the inner surface of the flange 9. This engagement however, being gradual, soft and easy, there is no avulsion regardless of how quickly the brake is applied.

It will be apparent that the farther the spider 22 is rotated about its axis, the greater the pressure will be which is exerted by the brake shoe 10 against the inner surface of the flange 9. Upon releasing the brake, the lever 24 will be returned to the position shown in the dotted line, by the usual spring (not shown).

The same operation is repeated for operating the emergency brake lever 33, except that in this instance, the brake shoes 12 are swung inwardly upon the pivots 14 causing their friction engaging surfaces to clamp the outer surface of the flange 11. It will be thus apparent that I have provided a brake having selectively operated member but which do not engage the same frictional surfaces, thereby accomplishing the objects hereinbefore set forth.

Having described my invention what I regard as new and desire to secure by Letters Patent is:

1. A brake comprising an inner and an outer brake drum, a series of friction shoes, means to move said shoes outwardly into engagement with the inner surface of the outer drum, a second series of shoes, means to move them inwardly into engagement with the periphery of the inner drum, and means to actuate either series of shoes.

2. A brake comprising an inner and an outer brake drum, a series of friction shoes, anti-friction means to move said shoes outwardly into engagement with the inner surface of the outer drum, a second series of shoes, anti-friction means to move them inwardly into engagement with the periphery of the inner drum, and means to actuate either series of shoes.

3. A brake comprising an inner and an outer brake drum, a series of friction shoes, means to move said shoes outwardly into engagement with the inner surface of the outer drum, a second series of shoes, means to move them inwardly into engagement with the periphery of the inner drum, and means to actuate either series of shoes, a plate which closes the interior of the outer drum, and means to anchor said plate against rotation.

4. A brake comprising an inner and an outer brake drum, a series of friction shoes, pivots upon which said shoes swing, means to move said shoes outwardly into engagement with the inner surface of the outer drum, a second series of shoes, pivots upon which said shoes swing, means to move them inwardly into engagement with the periphery of the inner drum, means to actuate either series of shoes, a plate which closes the interior of the outer drum, means to anchor said plate against rotation, said pivots being mounted in said anchor plate.

In testimony whereof I have signed the foregoing specification.

RICHARD SCHMITZ.